Oct. 13, 1964      D. R. EASTMAN      3,152,969
PHOTOCONDUCTOLITHOGRAPHY EMPLOYING HYDROPHOBIC IMAGES
Filed July 28, 1960
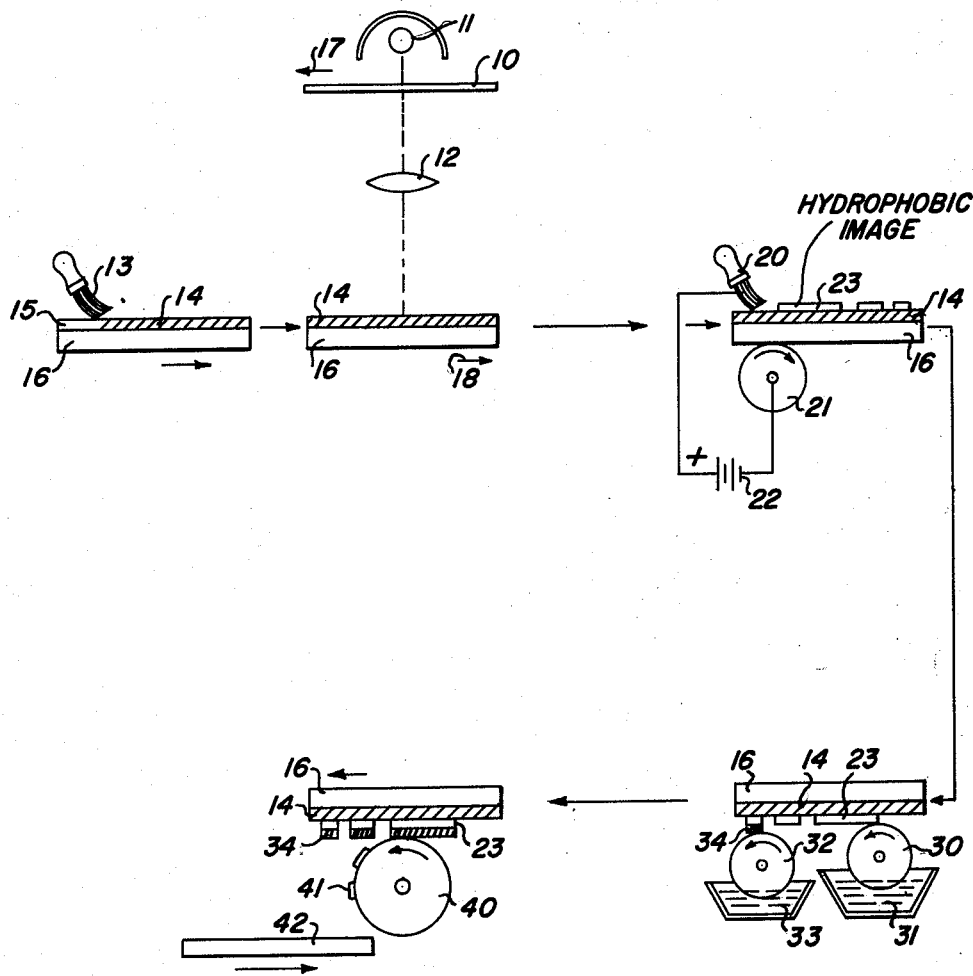
DONALD R. EASTMAN
INVENTOR.
BY R. Frank Smith
F. M. Emerson Holmes
ATTORNEYS ର
United States Patent Office 3,152,969
Patented Oct. 13, 1964

3,152,969
PHOTOCONDUCTOLITHOGRAPHY EMPLOYING
HYDROPHOBIC IMAGES
Donald R. Eastman, Rochester, N.Y., assignor to Eastman Kodak Company, Rochester, N.Y., a corporation of New Jersey
Filed July 28, 1960, Ser. No. 45,949
7 Claims. (Cl. 204—17)

This invention relates to photoconductography.

Photoconductography forms a complete image at one time or at least a non-uniform part of an image as distinguished from facsimile which at any one time produces only a uniform dot.

Cross reference is made to the following series of co-filed applications.

Serial No. 45,940, John W. Castle, Jr., "Photoconductography Employing Reducing Agents."

Serial No. 45,941, Raymond F. Reithel, "Photoconductolithography Employing Nickel Salts," now abandoned, see continuation-in-part Serial No. 120,863, filed June 7, 1961, now U.S. Patent 3,106,157.

Serial No. 45,942, Raymond F. Reithel, "Photoconductolithography Employing Magnesium Salts," now U.S. Patent 3,053,179.

Serial No. 45,943, Raymond F. Reithel, "Photoconductography Employing Spongy Hydroxide Images," now abandoned, see continuation-in-part Serial No. 120,035, filed June 27, 1961, now U.S. Patent 3,106,158.

Serial No. 45,944, Raymond F. Reithel, "Method for Making Transfer Prints Using a Photoconductographic Process."

Serial No. 45,945, Raymond F. Reithel, "Photoconductography Employing Manganese Compounds," now abandoned, see continuation-in-part Serial No. 271,412, filed April 8, 1963.

Serial No. 45,946, Raymond F. Reithel, "Photoconductography Employing Molybdenum or Ferrous Oxide," now abandoned, see continuation-in-part Serial No. 120,036, filed June 27, 1961, now U.S. Patent 3,106,156.

Serial No. 45,947, Raymond F, Reithel, "Photoconductography Employing Cobaltous or Nickelous Hydroxide," now abandoned, see continuation-in-part Serial No. 120,037, filed June 27, 1961, now U.S. Patent 3,057,788.

Serial No. 45,948, Donald R. Eastman, "Electrophotolithography."

Serial No. 45,950, Donald R. Eastman and Raymond F. Reithel, "Photoconductography Employing Electrolytic Images to Harden or Soften Films," now U.S. Patent 3,106,516.

Serial No. 45,951, Donald R. Eastman and Raymond F. Reithel, "Photoconductography Employing Absorbed Metal Ions," now abandoned, see continuation-in-part Serial No. 120,038, filed June 27, 1961.

Serial No. 45,952, Donald R. Eastman and Raymond F. Reithel, "Photoconductography Employing Spongy Images Containing Gelatin Hardeners," now U.S. Patent 3,106,517.

Serial No. 45,953, John J. Sagura, "Photoconductography Employing Alkaline Dye Formation," now U.S. Patent 3,057,787.

Serial No. 45,954, John J. Sagura and James A. Van Allan, "Photoconductography Employing Quaternary Salts."

Serial No. 45,957, Nicholas L. Weeks, "Photoconductography Involving Transfer of Gelatin."

Serial No. 45,958, Donald R. Eastman, "Photoconductolithography Employing Rubeanates," now U.S. Patent 3,095,808.

Serial No. 45,959, Donald R. Eastman and Raymond F. Reithel, "Electrolytic Recording With Organic Polymers," now U.S. Patent 3,106,155.

Electrolytic facsimile systems are well known. Electrolytic photoconductography is also known and is described in detail in British 188,030, Von Bronk, and British 464,112, Goldmann, modifications being described in British 789,309, Berchtold, and Belgium 561,403, Johnson et al.

This invention relates particularly to photoconductolithography and differs from other photoconductolithography processes in that a hydrophobic image is deposited on the photoconductor which is hydrophilic.

The object of the invention is to provide a photoconductolithographic process which is negative to positive, when greasy inks are used or is positive to positive when used with inks in which the colorant is in a water phase (solution or suspension). Normal press operating conditions use greasy litho inks and accordingly the present process is normally a negative to positive one.

A special object of the invention is to provide a photoconductographic process in which a hydrophobic image is deposited.

It is known that zinc oxide in resin may be rendered hydrophilic. For example Australian Patent 210,374, Sugarman, discusses this possibility as one form of xerolithography. It also discusses methods of rendering the surface of cellulose acetate and other plastics hydrophilic which are useful in xerolithography but which are not commonly used in photoconductography. In adidtion to the basic differences between xerolithography and photoconductolithography, there is another very essential difference between the present invention and the particular process described in the above-mentioned Australian patent. In the Australian patent a hydrophobic xerographic image is laid down on a hydrophobic photoconductor. The photoconductor is then treated to be made hydrophilic and the treatment must be such as not to spoil the hydrophobicity of the xerographic image thereon. The treatment can not be applied before the xerographic step since xerography depends on the ability of a surface to store a charge. The hydrophilic surface would lose the charge.

The present invention on the other hand is not concerned with the storage of charge nor does it require anywhere near the high orders of resistance involved in xerography. In the present invention, the zinc oxide in resin layer is treated before exposure and development. Furthermore the photoconductographic process would be inoperative if the treatment were applied after the electrolytic image had been deposited.

Nevertheless the various methods for rendering zinc oxide in resin hydrophilic as described in the Australian patent, as well as several of the methods described below can be used in the present invention, provided this treatment is applied before exposure as required by the present invention.

One object of the invention is to permit the treatment of the zinc oxide layer to be done by the manufacturer, thus eliminating for the customer one step of the process.

On the other hand, bathing or wiping a photoconductor to make the surface thereof hydrophilic is not too difficult and the customer may be willing to perform this step. Accordingly, one of the special objects of the present invention is to provide a versatile process so that the customer can start with a standard photoconductography plate (zinc oxide in resin on an aluminum-paper laminate) and by normal photoconductolithographic processes described in some of the cofiled applications, he may deposit a hydrophilic image and print with greasy inks to get a positive to positive process. Alternatively he has the choice by the present invention, of first treating the standard photoconductographic plate to render it hydrophilic and then depositing a hydrophobic image therein to produce a litho plate which when used with greasy inks provides a negative to positive process. Throughout this description the term ink will be used in its normal sense to denote a greasy non-aqueous ink unless the contrary is explicitly stated.

Thus according to the invention a photoconductive zinc oxide in resin layer is rendered hydrophilic, by known methods or those discussed below, and then a photoconductographic image which is hydrophobic is deposited thereon. This plate is immediately useful for standard lithoprinting and is most successful.

In preferred embodiments of the invention certain resins are used as binder for the zinc oxide, certain salts are used for rendering the photoconductor hydrophilic and certain electrolytes are used for depositing the hydrophobic image.

As binders for the photoconductive zinc oxide there can be used styrene butadiene copolymer or silicone resins or combinations of these two. Piccopale may be added in small amounts to such combinations. Piccopale is a polymerization product (sold by Pennsylvania Industrial Chemical Corp.) obtained by catalytically reacting a mixture of monomers having an average molecular weight of approximately 90, composed essentially of dienes and reactive olefins, to produce hard resins with an average molecular weight of approximately 1100. It is essentially a methylated paraffin chain containing only a limited amount of unsaturation. The silicone resin SR-82 supplied by General Electric probably varies somewhat in composition but any of the variations are applicable to the present invention. An example of such a silicon has a repeating formula in which each unit is $C_{36}H_{44}O_7Si_6$ containing about 55% carbon, 5 to 6% hydrogen, about 20% silicon, about 2% hydroxyl, about 30 to 50% phenyl and the ratio of moles of carbon to moles of silicon being about 6:1. Such silicone resins are well known and all such resins are useful in the present invention.

To render the zinc oxide resin layer hydrophilic it is preferably treated with a solution of an alkali metal iron complex cyanide such as the ferrocyanide or ferricyanide of potassium, sodium or lithium or with a solution of ferrous chloride. The above-identified Australian patent suggests that the water soluble acetates, nitrates, chlorides and formates of bivalent or multivalent metals such as barium, cadmium, calcium, cobalt, copper, lead, magnesium, nickel, strontium and zinc, will act to make the zinc oxide, resin, surfaces hydrophilic, but I prefer to use an alkali metal iron complex cyanide or ferrous chloride.

In order to produce hydrophobic images, the developer or electrolyte preferably contains 1-ethyl quinaldinium iodide or contains metal ions and benzoin-α-oxime, the metal being iron or manganese. The iron may be in the form of ferrous chloride which salt can thus be used both in the previous step to make the layer hydrophilic and along with benzoin-α-oxime in the electrolyte for developing the image. The ferrous chloride solution when used to provide hydrophilicity is however, more acid. Alternatively manganese nitrate is a suitable source of manganese ion in the developer.

The invention will be more fully understood when read in connection with the drawing which shows:

A schematic flow chart of a preferred embodiment of the invention.

In the drawing a zinc oxide in resin photoconductive layer 15 carried on a conducting support 16 is treated with a solution from a brush 13 to be rendered hydrophilic as indicated by the shaded areas 14. Thus before exposure, the photoconductor has become a hydrophilic one represented by the layer 14 on a conducting support 16. Light from a negative transparency 10 illuminated by a lamp 11 is focused by a lens 12 on the surface of the hydrophilic photoconductor 14. The transparency 10 is moved to the left as indicated by the arrow 17 and the receiving surface 14 is moved synchronously with the image of the transparency 10 as indicated by the arrow 18. The surface is then developed (while the photoconductivity image persists) by an electrolytic bath provided by a brush 20. Current flows between the brush 20 and a counter electrode 21, the difference in potential being supplied by a source indicated schematically at 22. The zinc oxide acts as the cathode, even if A.C. potential is used because of the rectifying effect of zinc oxide in an electrolytic system. The image 23 electrolytically deposited is hydrophobic. The plate is immediately ready for lithoprinting as illustrated schematically.

The areas of the photoconductor 14 not covered by the image 23 are moistened by a moistening roller 30 applying a fountain solution 31. The plate is then passed over an inking roller 32 which applies a greasy ink 33 which adheres only to the image areas 23 which are hydrophobic but which ink is repelled by the hydrophilic surface of the photoconductor 14. The ink on the image is indicated at 34. Then by the use of offset techniques, this ink 34 is transferred to a drum 40 as indicated at 41 and in due course the ink prints onto a succession of sheets of paper 42. The treatment by the brush 13 can be applied immediately before exposure or can be applied by the manufacturer. When potassium ferrocyanide or potassium ferricyanide are used, a 5% by weight water solution made acid preferably by adding either hydrochloric acid or aluminum chloride hexahydrate is satisfactory. The pH of the solution is lowered to 3.0 or less.

*Example 1*

The surface of a sheet of photoconductive material consisting of zinc oxide dispersed in resin (3 parts of zinc oxide to one part of resin by weight) was coated on an aluminum foil paper laminate and then was rendered hydrophilic by treating with an aqueous solution containing 10% by weight of ferrous chloride tetrahydrate. It was rinsed with distilled water and dried for a half-hour at room temperature. The particular resins used contained 80% styrene-butadiene copolymer, 10% of the above discussed silicone resin having about 6:1 ratio of moles of carbon to moles of silicone and 10% of Piccopale.

Other resins commonly used in photoconductography work equally well.

A sheet was then exposed for 10 seconds to 15 ft. candle tungsten radiation incident upon a silver step-tablet in contact with the photoconductive surface. Upon termination of the exposure, the print was then electrolytically developed with a viscose sponge wet with a solution consisting of 30 ml. of a one-percent aqueous solution of ferrous chloride tetrahydrate and 15 ml. of ethyl alcohol in which was dissolved 0.15 gram of benzoin-α-oxime. The sponge was held at a potential of 80 volts, positive, with respect to the aluminum-foil backing of the photoconductive layer. The surface of the print was then rinsed with water, and wetted-out with a 1:7 water dilution of standard fountain solution (Repelex fountain solution for paper duplimats is marketed by Addressograph-Multigraph Corp.) and then hand-inked with a plastic roller with a greasy lithographic ink (Jet Halftone Black offset ink).

The areas carrying image deposit which had been exposed for 5 ft. candle seconds, or greater, held the ink. The unexposed areas, or those exposed for less than 2 ft. candle seconds, rejected the ink.

*Example 2*

The surface of another sheet of this photoconductive material was treated with an aqueous solution containing 5 percent (by weight) potassium ferrocyanide trihydrate made acid (pH=2.5) with hydrochloric acid, rinsed with water, and then dried for approximately one-half hour.

The sheet was then exposed for 10 seconds to 15 ft. candle tungsten radiation through a silver step tablet as described in Example 1 and then electrolytically developed as in Example 1 with a developer carried in a cotton pad, consisting of 20 ml. of an aqueous solution of one-percent manganous nitrate and 10 ml of ethyl alcohol in which was dissolved 0.1 gram benzoin-α-oxime. The surface was rinsed with water and "wetted-out" with 1:7 Repelex fountain solution and then inked with a standard greasy ink (Kwiklith Process Black No. 24438, Consolidated Printing Ink Co.).

The areas carrying image deposit which had been exposed for 10 ft. candle seconds, or greater, held the ink. The unexposed areas, or those exposed for less than 5 ft. candle seconds, rejected the ink.

*Example 3*

Another sheet of photoconductive material was treated in the same manner as described in Example 2 except that the 5-percent potassium ferrocyanide solution was made acid (pH=2.5) with sulfuric acid. The treated material was stored in a light-tight container for three days.

The sheet was exposed for 10 seconds to the projected (enlarged 6×) image of a microfile negative (background density D.=1.1) of an engineering drawing. At this magnification, the image intensity at the exposure plane was approximately 4 ft. candle.

Electrolytic development was carried out using the same technique and developer formula as in Example 2. The surface of the print was then rinsed with water, and with 1:7 Repelex fountain solution.

When run on a No. 1250 Multilith Press, using Van Son Black No. 40904 ink and 1:32 Repelex fountain solution in the press, this master produced 200 copies of good quality.

*Example 4*

The surface of a sheet of photoconductive material was treated as in Example 2 and then exposed for 10 seconds to 400 ft. candle tungsten radiation through a silver step-tablet. Electrolytic development, using the technique of the preceding example was carried out with an aqueous solution, carried in a cotton pad, containing 1 percent (by weight) of 1-ethylquinaldinium iodide. The surface was then rinsed with water, "wetted out" with 1:7 Repelex, then inked. The areas which had been exposed for 4000 ft. candle seconds were ink receptive. The unexposed areas, or those exposed for less than 2000 ft. candle seconds, were ink-repellent. Thus the plate has particularly "high-contrast."

Having thus described various examples of my invention it is pointed out that this invention is not limited thereto.

I claim:

1. In the process of producing a lithographic plate by photoconductolithography, the steps comprising: rendering a surface of a layer of photoconductive zinc oxide in resin hydrophilic, then forming an image pattern of variations in electrical conductivity across the said surface of the layer, and then electrolytically cathodically depositing on the said surface of the layer a hydrophobic image distributed in accordance with the variations of electrical conductivity to form the plate.

2. The process according to claim 1 in which the layer contanis primarily a resin selected from the group consisting of styrene-butadiene copolymer, silicone resin, and mixtures thereof.

3. The process according to claim 1 in which said step of rendering hydrophilic comprises treating the layer with an acid solution of a metal salt selected from the group consisting of alkali metal iron complex cyanides and ferrous chloride.

4. The process according to claim 1 in which said step of electrolytically cathodically depositing includes the use of an electrolyte containing a compound selected from the group consisting of benzoin-α-oxime and 1-ethylquinaldinium iodide.

5. In the process of producing a lithographic plate by photoconductolithography, the steps comprising rendering hydrophilic a surface of a layer of zinc oxide in a binder containing primarily a resin selected from the group consisting of styrene-butadiene copolymer and silicone resin by treating the surface with an acid solution of a metal salt selected from the group consisting of alkali metal iron complex cyanides and ferrous chloride; forming an image pattern of variations in electrical conductivity across the said surface of the layer; and then electrolytically cathodically depositing on the surface of the layer a hydrophobic image distributed in accordance with the variations of electrical conductivity.

6. The process according to claim 5 in which said depositing step includes the use of an electrolyte containing a compound selected from the group consisting of benzoin-α-oxime and 1-ethylquinaldinium iodide.

7. The process according to claim 4 in which the electrolyte contains said benzoin-α-oxime and metal ions selected from the group consisting of iron and manganese.

References Cited in the file of this patent

UNITED STATES PATENTS

| | | |
|---|---|---|
| 2,763,553 | Clark et al. | Sept. 18, 1956 |
| 2,952,536 | Kurz | Sept. 13, 1960 |
| 2,993,787 | Sugarman | July 25, 1961 |
| 3,010,883 | Johnson et al. | Nov. 28, 1961 |

FOREIGN PATENTS

| | | |
|---|---|---|
| 215,754 | Australia | June 23, 1958 |